US010906476B2

(12) United States Patent
Preisler et al.

(10) Patent No.: US 10,906,476 B2
(45) Date of Patent: Feb. 2, 2021

(54) VEHICLE TRIM PART HAVING A LAYERED, DECORATIVE FINISH AND CONFIGURED TO FORM A LIGHT PATTERN AT THE FRONT OF THE PART

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 16/002,130

(22) Filed: Jun. 7, 2018

(65) Prior Publication Data

US 2018/0281701 A1 Oct. 4, 2018

Related U.S. Application Data

(63) Continuation of application No. 14/264,598, filed on Apr. 29, 2014, now abandoned.

(51) Int. Cl.
*B60Q 1/00* (2006.01)
*B60R 13/02* (2006.01)
(Continued)

(52) U.S. Cl.
CPC ............... *B60R 13/02* (2013.01); *B60Q 3/20* (2017.02); *B60R 13/005* (2013.01); *B60R 2013/0287* (2013.01)

(58) Field of Classification Search
CPC ....... B60R 13/02; B60R 13/04; B60R 13/005; B60R 13/0206; B60R 2013/0287;
(Continued)

(56) References Cited

U.S. PATENT DOCUMENTS 5,895,115 A 4/1999 Parker et al.
6,158,867 A 12/2000 Parker et al.
(Continued)

FOREIGN PATENT DOCUMENTS

DE 102006016068 A1 * 10/2007 ............... B60Q 3/54
GB 2492100 A 12/2012

OTHER PUBLICATIONS

Espacenet English translation of reference Guenther, DE 102006016068 A1.*

*Primary Examiner* — William J Carter
*Assistant Examiner* — Omar Rojas Cadima
(74) *Attorney, Agent, or Firm* — Brooks Kushman P.C.

(57) ABSTRACT

A vehicle trim part having a layered, decorative finish is provided. The part includes a polymeric substrate, a decorative layer overlying the polymeric substrate and a light-transmissive, protective layer overlying and protecting the decorative layer. The protective layer includes a front surface and a rear surface having a surface portion with a translucent surface finish. The decorative layer has an opening extending from a rear surface of the decorative layer to a front surface of the decorative layer and aligned with the translucent surface finish. Both a cross section of the opening at the front surface of the decorative layer and the translucent surface finish are sized and shaped to form a light pattern which is visible at the front of the part when artificial lighting illuminates the translucent surface finish from the rear of the part.

16 Claims, 2 Drawing Sheets

(51) Int. Cl.
  *B60Q 3/20*   (2017.01)
  *B60R 13/00*  (2006.01)

(58) Field of Classification Search
  CPC ..... B60R 13/00; B60Q 1/2611; B60Q 1/2619; B60Q 1/2669; B60Q 1/2607; B60Q 1/2665; B60Q 3/02; B60Q 3/0279; B60Q 3/0203; B60Q 3/0293; B60Q 3/001; B60Q 3/0286; B60Q 3/0209; B60Q 3/0216; B60Q 2500/10; F21S 48/215; F21S 48/23; F21S 48/22; B23Q 3/086; B29C 33/3857; B29C 33/40
  See application file for complete search history.

(56) References Cited

U.S. PATENT DOCUMENTS

| | | | |
|---|---|---|---|
| 6,193,399 B1 | 2/2001 | Hulse | |
| 6,464,381 B2 | 10/2002 | Anderson, Jr. et al. | |
| 6,594,417 B1 | 7/2003 | Hulse | |
| 6,652,128 B2 | 11/2003 | Misaras | |
| 6,974,238 B2 | 12/2005 | Sturt et al. | |
| 7,150,550 B2 | 12/2006 | Bogdan et al. | |
| 7,201,588 B2 | 4/2007 | Nishigaki et al. | |
| 7,237,933 B2 | 7/2007 | Radu et al. | |
| 7,299,892 B2 | 11/2007 | Radu et al. | |
| 7,387,397 B2 | 6/2008 | Konet et al. | |
| 7,987,030 B2 | 7/2011 | Flores et al. | |
| 8,016,465 B2 | 9/2011 | Egerer et al. | |
| 8,075,173 B2 | 12/2011 | Shallcross et al. | |
| 8,162,519 B2 | 4/2012 | Salter et al. | |
| 8,215,810 B2 | 7/2012 | Welch, Sr. et al. | |
| 8,235,567 B2 | 8/2012 | Hipshier et al. | |
| 8,256,945 B2 | 9/2012 | Choquet | |
| 8,408,627 B2 | 4/2013 | Mann | |
| 8,408,766 B2 | 4/2013 | Wilson et al. | |
| 8,425,062 B2 | 4/2013 | Bowden et al. | |
| 8,449,161 B2 | 5/2013 | Igoe et al. | |
| 8,469,562 B2 | 6/2013 | Marzorati et al. | |
| 8,596,803 B2 | 12/2013 | Schultz et al. | |
| 8,627,586 B2 | 1/2014 | Bozio et al. | |
| 2005/0063064 A1* | 3/2005 | Becker | F21V 5/04 359/599 |
| 2006/0038325 A1 | 2/2006 | Ostrander et al. | |
| 2006/0176710 A1* | 8/2006 | Meinke | B60Q 1/2669 362/503 |
| 2007/0186404 A1* | 8/2007 | Drew | B23C 3/10 29/557 |
| 2009/0129050 A1 | 5/2009 | Selby et al. | |
| 2009/0251917 A1 | 10/2009 | Wollner et al. | |
| 2010/0186214 A1 | 7/2010 | Judge | |
| 2011/0002138 A1 | 1/2011 | Hayes et al. | |
| 2012/0188779 A1 | 7/2012 | Schultz et al. | |
| 2012/0217767 A1 | 8/2012 | Pennington | |
| 2013/0279188 A1 | 10/2013 | Entenmann et al. | |
| 2014/0077531 A1 | 3/2014 | Preisler et al. | |

\* cited by examiner

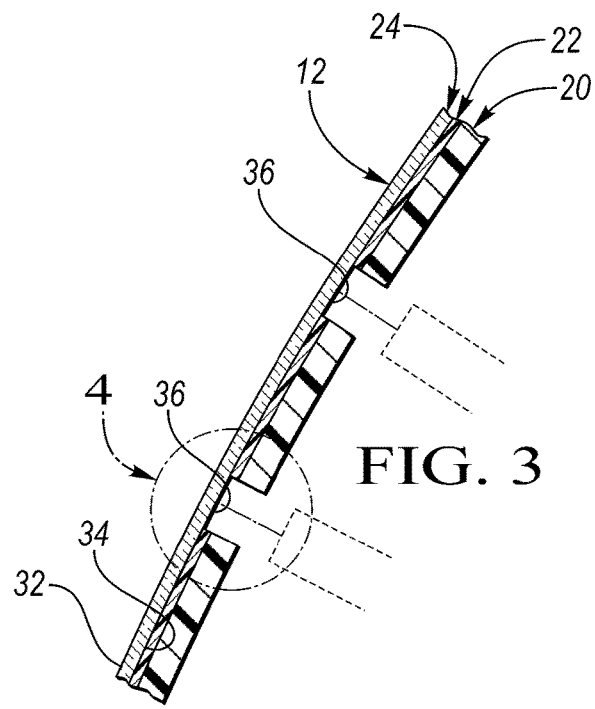
FIG. 3
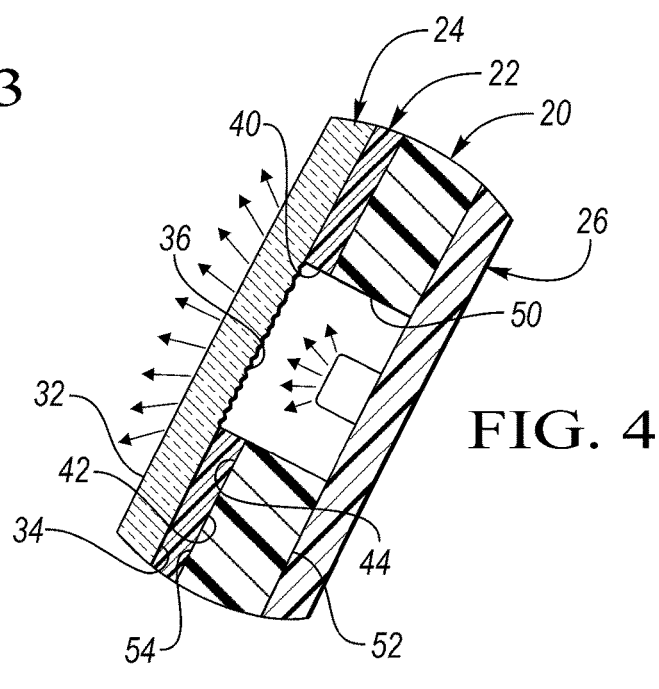
FIG. 4
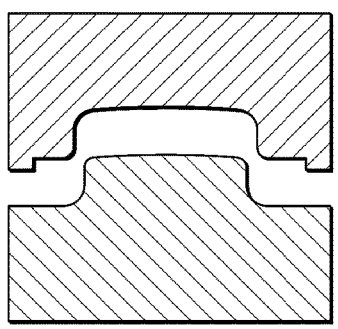
FIG. 5
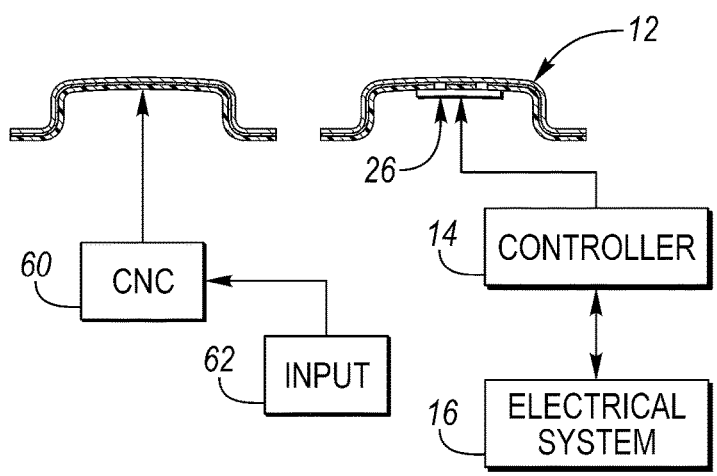

VEHICLE TRIM PART HAVING A LAYERED, DECORATIVE FINISH AND CONFIGURED TO FORM A LIGHT PATTERN AT THE FRONT OF THE PART

CROSS-REFERENCE TO RELATED APPLICATIONS

This application is a continuation of U.S. application Ser. No. 14/264,598 filed Apr. 29, 2014, the disclosure of which is incorporated in its entirety by reference herein.

TECHNICAL FIELD

This invention generally relates to vehicle trim parts and, in particular, to such parts which are configured to form a light pattern at the front of the parts.

Overview

Interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

More recently, distributed light systems have found use in vehicles. These may use fiber optics or other means to deliver the light to a desired location. The use of a lens and focusing or dispersing devices may be employed to direct the light.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

Vehicles are commonly provided with various types of decorative trim parts. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of a light source or by making the logo element luminescent. The first method is not feasible for logos in most common locations, while the latter method may adversely affect the occupants' vision.

Some plastic automotive parts are covered with wood trim after they are molded. Sometimes such plastic parts are composite plastic parts wherein an outer layer of the part is in-molded with a structural substrate of the part.

One practice in the automotive industry is utilization of all-plastic, fabricated parts, such as, but not limited to, instrument panels, interior trims, and door panels. It is known in other automotive parts areas that different, aesthetically pleasing outer surfaces enhance the overall appearance of the interior of automotive vehicles. Use of decorative appliques having wood grain finishes is often sought after.

Wood grain finishes are typically in the form of either simulated wood grain or genuine wood grain. The simulated wood grain finish may be achieved in one of several known manners: 1) backing a pre-printed film by a thin layer of a thermoplastic, such as polycarbonate; ABS (acrylonitrile/butadiene/styrene), or aluminum, followed by vacuum-forming to obtain the desired shape of the trim; 2) applying a lithograph on an aluminum sheet; and 3) dipping a substrate into a container of ink defining the wood grain appearance. Simulated wood grain finishes, however, are generally not as attractive as genuine wood grain finishes.

Genuine wood grain finishes may also be obtained in one of several known manners: 1) staining, sealing and protecting preformed laminates of wood having varying thicknesses which are then attached to a substrate via stapling, gluing, or any other similar attachment manner; 2) laminating an aluminum sheet with the genuine wood which is then welded or screwed onto a plastic part; and 3) adhesively bonding a thin laminate of wood to a pre-processed plastic substrate which is then stained and covered with a protective top-coat. Although the appearance of genuine wood is more attractive than simulated wood, the use of genuine wood is more expensive than that of simulated wood.

Compression molding is a method of molding in which the molding material, generally preheated, is first placed in an open, heated mold cavity. The mold is closed with a top force or plug member, pressure is applied to force the material into contact with all mold areas, while heat and pressure are maintained until the molding material has cured. The process may employ thermosetting resins in a partially cured stage, either in the form of granules, putty-like masses, or preforms. Compression molding is a high-volume, high-pressure method suitable for molding complex, high-strength fiberglass reinforcements. Advanced composite thermoplastics can also be compression molded with unidirectional tapes, woven fabrics, randomly oriented fiber mat or chopped strand. The advantage of compression molding is its ability to mold large, fairly intricate parts. Also, it is one of the lowest cost molding methods compared with other methods such as transfer molding and injection molding; moreover it wastes relatively little material, giving it an advantage when working with expensive compounds.

The following U.S. patent documents are related to the present invention: U.S. Pat. Nos. 5,895,115; 6,158,867; 6,193,399; 6,464,381; 6,594,417; 6,652,128; 6,974,238; 7,150,550; 7,201,588; 7,237,933; 7,299,892; 7,387,397; 7,987,030; 8,016,465; 8,075,173; 8,162,519; 8,215,810; 8,235,567; 8,256,945; 8,408,627; 8,408,766; 8,425,062; 8,449,161; 8,469,562; 8,596,803; and 8,627,586; and U.S. Published Applications 2009/0251917; 2011/0002138; 2012/0188779; 2012/0217767; 2013/0279188; and 2014/0077531.

Despite the teachings of the above U.S. patent documents, there is still a need for an easily and inexpensively manufactured vehicle trim part having a decorative, layered finish and configured to form a light pattern at the front of the part such as a logo or image.

SUMMARY OF EXAMPLE EMBODIMENTS

An object of at least one embodiment of the present invention is to provide a vehicle trim part having a layered, decorative finish and configured to form a light pattern at the front of the part and wherein the part can be easily and inexpensively manufactured.

In carrying out the above object and other objects of at least one embodiment of the present invention, a vehicle trim part including a polymeric substrate, a decorative layer overlying the polymeric substrate and a light-transmissive, protective layer overlying and protecting the decorative layer is provided. The protective layer includes a front surface and a rear surface having a surface portion with a translucent surface finish. The decorative layer has an opening extending from a rear surface of the decorative layer to a front surface of the decorative layer and aligned with the translucent surface finish. Both a cross section of the opening at the front surface of the decorative layer and the translucent surface finish are sized and shaped to form a light pattern which is visible at the front of the part when artificial lighting illuminates the translucent surface finish from the rear of the part.

A light pattern may be visible at the front of the part when natural lighting illuminates the translucent surface finish from the front of the part.

The protective layer may comprise a clear top coat layer.

The substrate may have an opening which extends from the rear surface of the substrate to a front surface of the substrate and which is aligned with the translucent surface finish and the opening in the decorative layer.

The decorative layer may be in contact with the substrate.

The protective layer may be in contact with the decorative layer.

The decorative layer may be in contact with the substrate and the protective layer.

The part may be an interior trim part.

The light pattern may be an image such as a graphic image.

The light pattern may be a logo.

The protective layer may be transparent.

The surface portion of the rear surface of the protective layer may be machined under controlled conditions to form the translucent surface finish.

The surface portion of the rear surface of the protective layer may be etched or blasted with a blasting material to form the translucent surface finish.

The front surface of the protective layer may be a class A front surface.

The decorative finish may be a wood grain finish.

The decorative layer may be opaque.

Further in carrying out the above object and other objects of at least one embodiment of the present invention, a vehicle trim part having a layered, decorative finish is provided. The part includes a polymeric substrate, a decorative layer overlying the polymeric substrate and a light-transmissive, protective layer overlying and protecting the decorative layer. The protective layer includes a front surface and a rear surface having a plurality of separate surface portions. Each of the surface portions has a translucent surface finish. The decorative layer has openings which extend from a rear surface of the decorative layer to a front surface of the decorative layer. Each of the openings is aligned with one of the translucent surface finishes. Cross sections of the openings at the front surface of the decorative layer and their corresponding translucent surface finishes are sized and shaped to form light patterns which are visible at the front of the part when artificial lighting illuminates the translucent surface finishes from the rear of the part.

Still further in carrying out the above object and other objects of at least one embodiment of the present invention, an illuminated vehicle trim part having a layered, decorative finish is provided. The part includes a polymeric substrate, a decorative layer overlying the polymeric substrate and a light-transmissive, protective layer overlying and protecting the decorative layer. The protective layer includes a front surface and a rear surface having a surface portion with a translucent surface finish. The decorative layer has an opening extending from a rear surface of the decorative layer to a front surface of the decorative layer and aligned with the translucent surface finish. The part also includes a source of illumination for emitting rays of light and disposed at the rear of the part so that the light rays fall on the translucent surface finish. The source is configured to be electrically coupled to an electrical system of the vehicle. Both a cross section of the opening at the front surface of the decorative layer and the translucent surface finish are sized and shaped to form a light pattern which is visible at the front of the part when the source of illumination illuminates the translucent surface finish with the light rays from the rear of the part.

Yet still further in carrying out the above object and other objects of at least one embodiment of the present invention, an illuminated vehicle trim part having a layered, decorative finish is provided. The part includes a polymeric substrate, a decorative layer overlying the polymeric substrate and a light-transmissive, protective layer overlying and protecting the decorative layer. The protective layer includes a front surface and a rear surface having a plurality of separate surface portions. Each of the surface portions has a translucent surface finish. The decorative layer has openings which extend from a rear surface of the decorative layer to a front surface of the decorative layer. Each of the openings is aligned with one of the translucent surface finishes. The part also includes at least one source of illumination for emitting rays of light and disposed at the rear of the part so that the light rays fall on the translucent surface finish. Each source is configured to be electrically coupled to an electrical system of the vehicle. Cross sections of the openings at the front surface of the decorative layer and their corresponding translucent surface finishes are sized and shaped to form light patterns which are visible at the front of the part when the at least one source of illumination illuminates the translucent surface finishes with the light rays from the rear of the part.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 3 is a view, partially broken away and in cross section, taken along lines 3-3 of FIG. 2A and schematically illustrating a process to texture a pair of spaced surface portions on the back surface of a protective layer to form translucent surface finishes;

FIG. 4 is an enlarged view of a circled portion of FIG. 3 to show one of the textured surfaces and further including artificial lighting to form a light pattern at the front of the part; and FIG. 5 is a schematic sectional view illustrating various apparatus for making and using the illuminated vehicle trim part constructed in accordance with at least one embodiment of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "substrate" refers to any flexible, semi-flexible or rigid single or multi-layer component having a surface to which a decorative layer or coating is or can be applied by the methods described herein such as, without limitation, polymers and other plastics, as well as composite materials. Furthermore, the shape of the substrate and particularly the surface to be coated or layered can be any part of an assembly or device manufactured by any of various methods, such as, without limitation, conventional molding, extruding, or otherwise fabricated. One preferred application contemplated herein is the coating of substrates that are automotive components such as automotive interior trim components.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent, layers.

Figure 1:
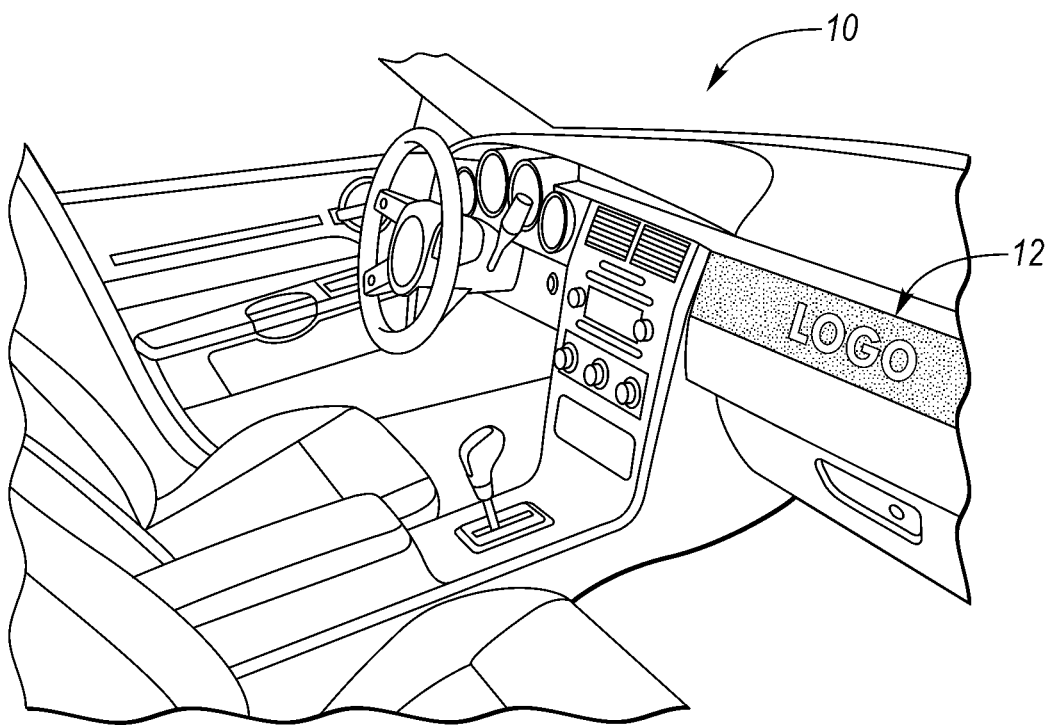
FIG. 1 is an environmental view, partially broken away, of the interior of passenger vehicle having vehicle trim part constructed in accordance with at last one embodiment of the present invention.

Referring now to FIG. 1, a motor vehicle, generally indicated at 10, may be equipped with a vehicle trim panel or part, generally indicated at 12, constructed in accordance with at least one embodiment of the present invention. While the part 12 is shown as an interior trim part 12, the trim part could be an exterior trim part.

As shown in FIG. 5, the part 12 may be electrically connected to a controller 14 which, in turn, is electrically connected or coupled to an electrical system 16 of the vehicle 10. The panel 12 is backlit and may be selectively turned "on" and "off" by the controller 14 which controllably supplies electrical power from the system 16 to the panel 12. The controller 14 is typically electrically connected to one or more switches and/or one or more sensors so that the panel 12 can be manually or automatically operated to turn the panel 12 "on" or "off". For example, the controller 14 can be electrically connected to an ignition switch, a light sensor, a headlight switch and/or an interior light switch as needed and/or desired.

Figure 2A:
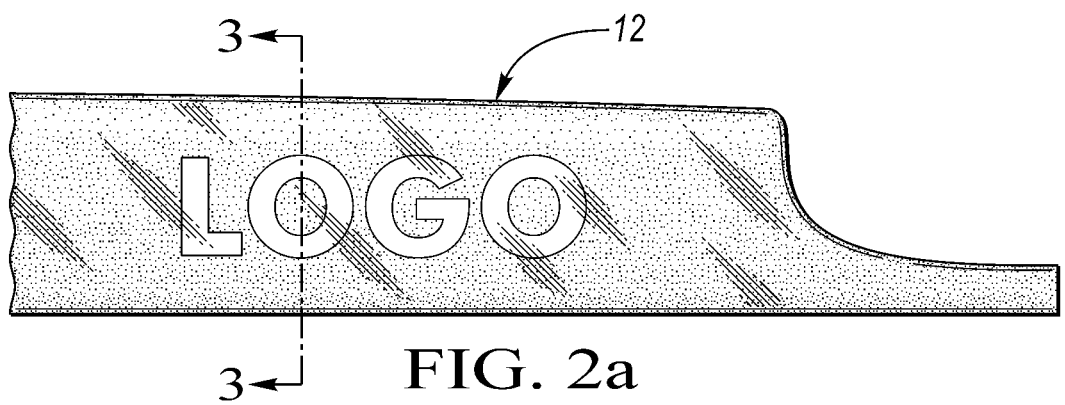
FIG. 2A is a front elevational view, partially broken away, of the vehicle trim part of FIG. 1 wherein the word "logo" is visible via natural, ambient light.
Figure 2B:
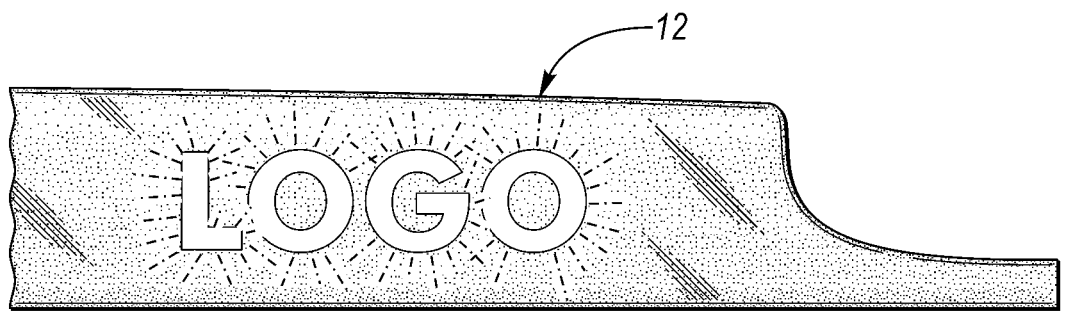
FIG. 2B is a view similar to the view of FIG. 2A, but with a "logo" light pattern visible via artificial light located at the rear of the part.

FIG. 2A shows the trim part 12 when not illuminated by artificial light at the rear of the part (i.e. not backlit). Rather, the part 12 is illuminated by ambient, natural lighting at the front of the part 12. FIG. 2B shows the trim part or panel 12 when illuminated by artificial light via side or back artificial lighting.

FIGS. 3 and 4 show the multiple layers of the part 12, including a polymeric substrate, generally indicated at 20, a decorative layer, generally indicated at 22, overlying the substrate 20 and a light-transmissive protective layer, generally indicated at 24, overlying and protecting the decorative layer 22. A source of illumination, generally indicated at 26, disposed at the rear of the part 12 converts the part 12 into an illuminated vehicle trim part. The source of illumination 26 may be coupled or connected to the substrate 20 or may be spaced away from the substrate 20 and supported by a different part of the vehicle 10.

The decorative layer 22 may comprise one of a decorative film, a foil, a laminate, a veneer, a fabric, paper or a coating. For example, the decorative layer 22 may comprise a coverstock sheet bonded to the substrate by press molding in a mold such as a mold, generally indicated at 30 in FIG. 5. The coverstock sheet may provide the trim panel 12 with a wood grain finish. The coverstock sheet may include a natural wood layer. The wood grain finish of each coverstock sheet may be simulated. The coverstock sheet may use a textured, real-wood surface appearance. The coverstock sheet may include a synthetic resin layer. The coverstock sheet may include a simulated real-wood layer. After the press or compression molding, a varnish or stain coating may be placed on the outer surface.

The protective layer 24 may be a clear top coat layer as overlying and protecting the decorative layer. The layer 24 may be a transparent or translucent plastic such as polycarbonate, acrylic, ABS, plexi-glass, lexant; polypropylene, poly(methyl methacrylate), thermoplastic urethane, polyester, copolyester alloy, cyclic olefin copolymer, poly-4-methyl-1-pentene, polysulphone, allyl diglycol carbonate, allyl ester, styrene-acrylonitrile, polystyrene, polyvinyl chloride and blends, alloys and combinations thereof. The layer 24 may include one or more pigments, tints, colored dyes, metallic flakes or light reflective particles therein. The layer 22 and/or the layer 24 may include one or more anti-fading components, one or more anti-soiling components and one or more water-repellant compounds.

The protective layer 24 includes a front surface 32 and a rear surface 34 having a one or more surface portions 36 with a translucent surface finish 36 which causes light to be dispersively transmitted through the layer 24. The surface finish 36 typically hides or conceals any artificial lighting apparatus or equipment located at the rear of the part 10 during either "on" or "off" conditions.

The decorative layer 22 has an opening 40 extending from a rear surface 42 of the decorative layer 22 to a front surface 44 of the decorative layer 22 and aligned with the translucent surface finish 36.

The substrate 22 also has an opening 50 which extends from a rear surface 52 of the substrate 22 to the front surface 54 of the substrate 22 and aligned with the translucent surface finish 36 and the opening 40 in the decorative layer 22. Both the opening 40 and the opening 50 may have a reflective layer (not shown) to reflect light rays from the source of illumination 26 towards the translucent surface finish 36.

The openings 40 and 50 may be machined through the layer 20 and the substrate 22, respectively, by a CNC machine 60 as shown in FIG. 5 after molding of the unfinished part in the mold 30. The sizes and shapes of the openings 40 and 50 are typically input into the machine 60 at an input 62 such as a graphical user interface for the machine 60. After the openings 40 and 50 are formed, the CNC machine 60 may machine, such as by grinding and/or polishing, portions 36 of the rear surface 34 of the layer 24 to form the translucent surface finish(es). Alternatively, the translucent surface finishes 36 may be formed by shot or sand blasting, acid or laser etching, or water pressure.

As described above, the unfinished part is typically molded without any logo or image as shown in FIG. 5. Then the logo or image is machined from the back side of the part at a predetermined depth into the part. The resulting pattern is visible by itself and also can be illuminated as previously described.

The source of illumination 26 may include an incandescent bulb, a fluorescent bulb, a light emitting diode (LED), a light pipe, an electroluminescent device, a neon or argon bulb or fiber optics. The light source(s) may produce light of any color or from any portion of the light spectrum. In various exemplary embodiments, a light filter (not shown) may be placed between the light source and the portions 36 of the rear surface 34. Also, the light source(s) may be included on or in the part 12 or spaced away from the part.

Both a cross section of the opening 40 at the front surface 44 of the decorative layer 22 and the translucent surface finish 36 are sized and shaped to form one or more light patterns which are visible at the front of the part 12 when artificial lighting illuminates the translucent surface finish from the rear of the part 12 as shown in FIG. 2B.

The one or more light patterns are visible at the front of the part 12 when natural lighting illuminates the translucent surface finish 36 from the front of the part 12 as is shown in FIG. 2A. The one or more light patterns may be one or more images such as one or more graphic images. The one or more light patterns may be a logo as shown in FIGS. 2A and 2B.

In summary, the part 12 is provided with a feature for lighting to show a logo or image at the front of the part 12. The lighted logo or image can be seen as an A-surface of the part. The image or logo can be viewed during the day and is illuminated at night.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle trim part comprising:
a compression molded polymeric substrate;
a compression molded decorative layer overlying the polymeric substrate; and
a compression molded light-transmissive, protective layer overlying and protecting the decorative layer, the protective layer including a front surface and a rear surface having a surface portion with a translucent surface finish to conceal illumination apparatus rearward of the part, the decorative layer having a machined opening extending from a rear surface of the decorative layer to a front surface of the decorative layer and aligned with the translucent surface finish, the substrate having a machined opening extending from the rear surface of the substrate to a front surface of the substrate and being aligned with the translucent surface finish and the opening in the decorative layer,
wherein both a cross section of the opening at the front surface of the decorative layer and the translucent surface finish are of the same size and aligned to form a congruent light channel to define a light pattern which is visible at the front of the part when artificial lighting illuminates the translucent surface finish from the rear of the part,
the polymeric substrate, decorative layer and protective layer being compression molded together as a laminate, wherein the laminate is compression molded as a unitary structure the opening of the substrate and the opening of the decorative layer being machined through the substrate and the decorative layer of the laminate from the rear surface of the substrate through the front surface of the decorative layer such that the opening of the substrate and the opening of the decorative layer are of the same size and aligned to form a congruent light channel.

2. The molded part as claimed in claim 1, wherein the light pattern is visible at the front of the part when natural lighting illuminates the translucent surface finish from the front of the part.

3. The molded part as claimed in claim 1, wherein the protective layer comprises a clear top coat layer.

4. The molded part as claimed in claim 1, wherein the opening of the substrate and the opening of the decorative layer are machined using a CNC machine.

5. The molded part as claimed in claim 4, wherein the translucent surface finish of each of the surface portions is formed by one or more of grinding and polishing via the CNC machine.

6. The molded part as claimed in claim 1, wherein the part is an interior trim part.

7. The molded part as claimed in claim 1, wherein the light pattern is an image.

8. The molded part as claimed in claim 7, wherein the image is a graphic image.

9. The molded part as claimed in claim 1, wherein the light pattern is a logo.

10. The molded part as claimed in claim 1, wherein the protective layer is transparent.

11. The molded part as claimed in claim 1, wherein the surface portion of the rear surface of the protective layer is etched or blasted with a blasting material to form the translucent surface finish.

12. The molded part as claimed in claim 1, wherein the decorative layer has a wood grain finish.

13. The molded part as claimed in claim 1, wherein the decorative layer is opaque.

14. A vehicle trim part comprising:
a compression molded polymeric substrate;
a compression molded decorative layer overlying the polymeric substrate; and
a compression molded light-transmissive, protective layer overlying and protecting the decorative layer, the polymeric substrate, decorative layer and protective layer being compression molded together as a laminate wherein the laminate is compression molded as a unitary structure, the protective layer including a front surface and a rear surface having a plurality of separate surface portions, each of the surface portions having a translucent surface finish to conceal illumination apparatus rearward of the part, the decorative layer having machined openings cut from a rear surface of the decorative layer to a front surface of the decorative layer, the substrate having machined openings cut from the rear surface of the substrate through a front surface of the substrate, each of the machined openings being aligned with one of the translucent surface finishes, wherein cross sections of the machined openings at the front surface of the decorative layer and their corresponding translucent surface finishes are of the same size and aligned to form a congruent light channels sized and shaped to form light patterns which are visible at the front of the part when artificial lighting illuminates the translucent surface finishes from the rear of the part through the light channels.

15. An illuminable vehicle trim part comprising:
a compression molded polymeric substrate;
a compression molded decorative layer overlying the polymeric substrate;
a compression molded light-transmissive, protective layer overlying and protecting the decorative layer, the protective layer including a front surface and a rear surface having a surface portion with a translucent surface finish to conceal illumination apparatus rearward of the part, the decorative layer having an opening extending from a rear surface of the decorative layer to a front surface of the decorative layer and aligned with the translucent surface finish, the substrate having an opening extending from the rear surface of the substrate through a front surface of the substrate and being aligned with the translucent surface finish and the opening in the decorative layer,
the polymeric substrate, decorative layer and protective layer being compression molded together as a laminate, wherein the laminate is compression molded as a unitary structure, the opening of the substrate and the opening of the decorative layer being compression molded machined via a CNC machine through the substrate and the decorative layer of the laminate from the rear surface of the substrate through the front surface of the decorative layer such that the opening of the substrate and the opening of the decorative layer are of the same size and aligned to form a congruent light channel, the translucent surface finish of each of the surface portions being formed by one or more of grinding and polishing via the CNC machine; and
a source of illumination for emitting rays of light and disposed at the rear of the part so that the light rays travel through the light channel to fall on the translucent surface finish, the source being configured to be electrically coupled to an electrical system of the vehicle and wherein both a cross section of the opening at the front surface of the decorative layer and the translucent surface finish are sized and shaped to form a light pattern which is visible at the front of the part when the source of illumination illuminates the translucent surface finish with the light rays from the rear of the part.

16. An illuminable vehicle trim part comprising:
a compression molded polymeric substrate;
a compression molded decorative layer overlying the polymeric substrate;
a compression molded light-transmissive, protective layer overlying and protecting the decorative layer, the protective layer including a front surface and a rear surface having a plurality of separate surface portions, each of the surface portions having a translucent surface finish to conceal illumination apparatus rearward of the part, the decorative layer having openings which extend from a rear surface of the decorative layer to a front surface of the decorative layer, each of the openings being aligned with one of the translucent surface finishes, the substrate having an opening extending from the rear surface of the substrate to a front surface of the substrate and being aligned with the translucent surface finish and the opening in the decorative layer,
the polymeric substrate, decorative layer and protective layer being compression molded together as a laminate, wherein the laminate is compression molded as a unitary structure, the opening of the substrate and the opening of the decorative layer being machined via a CNC machine through the substrate and the decorative layer of the laminate from the rear surface of the substrate through the front surface of the decorative layer such that the opening of the substrate and the opening of the decorative layer are of the same size and aligned to form a congruent light channel, the translucent surface finish of each of the surface portions being formed by one or more of grinding and polishing via the CNC machine; and
at least one source of illumination for emitting rays of light and disposed at the rear of the part so that the light rays travel through the light channel to fall on the translucent surface finish, each source being configured to be electrically coupled to an electrical system of the vehicle and wherein cross sections of the openings at the front surface of the decorative layer and their corresponding translucent surface finishes are sized and shaped to form light patterns which are visible at the front of the part when the at least one source of illumination illuminates the translucent surface finishes with the light rays from the rear of the part.

\* \* \* \* \*